United States Patent [19]

Saruyama et al.

[11] Patent Number: 4,555,560

[45] Date of Patent: Nov. 26, 1985

[54] ROOM TEMPERATURE VULCANIZABLE POLYORGANOSILOXANE COMPOSITIONS CONTAINING KETOXIMOSILANES AND ORGANOTITANATES

[75] Inventors: Toshio Saruyama, Narashino; Ryuzo Mikami, Ichihara, both of Japan

[73] Assignee: Toray Silicone Company, Ltd., Tokyo, Japan

[21] Appl. No.: 631,664

[22] Filed: Jul. 17, 1984

[30] Foreign Application Priority Data

Jul. 21, 1983 [JP] Japan ................................. 58-133136

[51] Int. Cl.$^4$ .............................................. C08G 77/06
[52] U.S. Cl. ..................................... 528/17; 524/860; 528/33; 528/34; 528/901
[58] Field of Search ...................... 528/17, 33, 34, 901; 524/860

[56] References Cited

U.S. PATENT DOCUMENTS

| 4,156,674 | 5/1979 | Sumimura | 524/863 |
| 4,460,740 | 7/1984 | Arai | 528/33 |

Primary Examiner—Melvyn I. Marquis
Attorney, Agent, or Firm—Roger H. Borrousch

[57] ABSTRACT

A room temperature vulcanizable polyorganosiloxane composition which cures to products, such as silicone rubber, which do not soil easily are made from mixing silanol containing polyorganosiloxane, ketoxime silicon compounds such as organotriketoximosilanes, and organotitanates.

9 Claims, No Drawings

ROOM TEMPERATURE VULCANIZABLE POLYORGANOSILOXANE COMPOSITIONS CONTAINING KETOXIMOSILANES AND ORGANOTITANATES

BACKGROUND OF THE INVENTION

1. Field of the Invention

This invention relates to a room temperature vulcanizable polyorganosiloxane composition. More specifically, this invention relates to a room temperature vulcanizable polyorganosiloxane composition whose cured product will not soil other substrates which have been brought into contact with the composition after the composition has been cured.

2. Background Information

Various room temperature vulcanizable polyorganosiloxane compositions which cure into resins or rubbers are conventionally used as electrical insulating materials, adhesives, coating materials, for sealing containers, and as a sealing material.

In particular, a so-called oxime-liberating room temperature vulcanizable polyorganosiloxane composition, which cures with the production of a ketoxime, is widely used as a single-package curable composition because it can be stored uncured in a sealed container for long periods of time and is rapidly cured by atmospheric moisture upon exposure to the atmosphere while seldom corroding other substrates which are brought into contact with it.

However, the above room temperature vulcanizable polyorganosiloxane composition suffers from the drawback of soiling other substrates which come into contact with the cured product when it is employed in the applications cited above. For example, when the composition is employed as an electrical insulating material, it causes poor contact by neighboring electrical contacts. When it is employed as a coating agent, it hydrophobicizes the underlying substrate. When it is employed as a construction sealing material, it soils the sealing joint and its surrounding areas. When it is employed to seal a container, polyorganosiloxane will elute into the sealed liquid.

Various methods were examined by the present inventors in investigating the causes of the above defects in ketoxime-liberating room temperature vulcanizable polyorganosiloxane compositions with the goal of improving these compositions and this invention was thus developed as a result.

SUMMARY OF THE INVENTION

The purpose of this invention is to provide a room temperature vulcanizable polyorganosiloxane composition whose cured product will not soil substrates brought into contact with it after it has been cured.

This invention relates to a room temperature vulcanizable polyorganosiloxane composition consisting essentially of the product obtained by mixing (A) 100 parts by weight of a polyorganosiloxane which has a viscosity at 25° C. of 0.001 to 0.2 m²/s, has at least two terminal silanol groups per molecule, contains ≦2 weight percent components with a polystyrene-based molecular weight of ≦5,000 according to the gel permeation chromatogram, and has organic radicals selected from the group consisting of monovalent hydrocarbon radicals and halogenated monovalent hydrocarbon radicals, (B) 0.5 to 30 parts by weight of ketoxime silicon compound selected from silane of the general formula $$RSi(O-N=X)_3$$

or its partial hydrolysis product wherein R represents a radical selected from the group consisting of alkyl, alkenyl, and phenyl, X represents $=CR_2'$ or $=CR^2$, each R' represents a monovalent hydrocarbon radical, and each $R^2$ represents a divalent hydrocarbon radical, and (C) 0.005 to 2 parts by weight of an organotitanate ester.

DETAILED DESCRIPTION OF THE INVENTION

Component (A) is a principal component of the room temperature vulcanizable polyorganosiloxane composition produced by the method of this invention. The molecular configuration of component (A) is straight chain or branched chain; however, it is preferably straight chain. In the case of a branched chain, the number of branch points must be ≦1% of the total number of silicon atoms in component (A) from the standpoint of an efficient production process. At least 2 terminal silanol groups are present per molecule in order to produce a three-dimensionally crosslinked structure after curing. Examples of silicon-bonded organic groups in the polyorganosiloxane of component (A) are monovalent hydrocarbon radicals such as alkyl, such as methyl and ethyl; alkenyl such as vinyl and allyl; aryl such as phenyl and tolyl; and halogenated monovalent hydrocarbon radicals such as haloalkyl such as 3-chloropropyl and 3,3,3-trifluoropropyl. One to three different species of these organic groups may be present in a single molecule. Among these groups, the usual case is methyl only or a mixture of °50 mol % methyl with other organic groups. The viscosity of component (A) at 25° C. is specified as 0.001 to 0.2 m²/s for the following reasons. When the viscosity falls below the above range, the cured product has poor mechanical strength, a modulus of elasticity which is too high, and its applicability is limited. On the other hand, when the viscosity exceeds the above range, the processability is extremely poor.

Furthermore, component (A) may be a mixture of compounds with different viscosities and organic groups. When a mixture of compounds with different viscosities is employed, the viscosity of each individual compound need not be in the range specified above, but the average viscosity must be in the above range.

A method for producing the polyorganosiloxane comprising component (A) is as follows.

(I) Cyclic diorganosiloxane oligomer and/or silanol group-terminated linear diorganosiloxane oligomer as starting materials are equilibration polymerized with cleavage and reformation of siloxane bond in the presence of an acid or basic catalyst. Alternately, only a silanol group-terminated linear diorganosiloxane oligomer as the starting material is polymerized by dehydropolycondensation in the presence of an acid or basic catalyst.

(II) The low molecular weight polyorganosiloxanes are subsequently removed by thin film stripping or a solvent wash, preferably by a solvent wash. The solvent to be used in the solvent wash is a compound which can selectively dissolve low molecular weight polysiloxanes of less than 5,000. The most desirable examples of poor solvents for polydimethylsiloxane are ethanol and acetone.

The molecular weight distribution of component (A) is verified by gel permeation chromatography (GPC). The GPC column must be usable for verification into the principal polymer range (for example, G4000H/G5000H) and the calibration curve may be constructed from a monodisperse polysiloxane which has been obtained by partial sedimentation. However, verification by comparison with the Q values for monodisperse polystyrene is the more usual method. Detection in GPC is usually carried out using the solution index of refraction. The molecular weight dependence of the solution index of refraction becomes almost negligible at a molecular weight of about 5,000, which is the important limit in this invention, and the GPC chart may be divided into higher and lower molecular weight regions at a polystyrene-based molecular weight of 5,000 and the areas of the two regions may be compared with each other in order to determine the quantity of components with molecular weights ≦5,000.

Component (B) reacts with the silanol groups of component (A) to form a crosslinked structure, that is, it is indispensable for the production of a cured composition. Component (B) is ketoxime silicon compound which is selected from an organotriketoximesilane with the general formula RSi (O—N=X)$_3$, wherein R and X retain their definitions from above or its partial hydrolysis product. The R in the organotriketoximesilane is an alkyl such as methyl, ethyl, or propyl or an alkenyl such as vinyl or allyl. The R$^1$ is a monovalent hydrocarbon radical such as an alkyl such as methyl, ethyl, or propyl; an alkenyl such as vinyl or allyl; or an aryl such as phenyl or tolyl. The R$^2$ is a divalent hydrocarbon group such as an alkylene such as

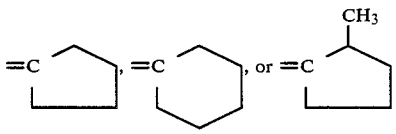

Among these, dialkyl ketoxime groups and particularly the dimethyl ketoxime group and methyl ethyl ketoxime group are preferred from the standpoints of economical silane production as well as their high reactivity with silanol groups. Examples of the organotriketoximesilane are methyltri(dimethyl ketoxime)silane, methyltri(methyl ethyl ketoxime)silane, and vinyltri(methyl ethyl ketoxime)silane. Component (B) can be a single compound or a mixture of 2 or more compounds. The total quantity of component (B) is 0.5 to 30 parts by weight and preferably 2 to 20 parts by weight per 100 parts by weight of component (A). When the quantity of component (B) falls below the above range, curing will be incomplete. When the quantity of component (B) exceeds the above range, the curing rate is reduced and it is also economically disadvantageous.

The organotitanate ester comprising component (C) is indispensable for completing the curing reaction of component (A) with component (B). Examples of component (C) are tetraisopropyl titanate, tetra-n-butyl titanate, bis(acetylacetonate)titanium diisopropoxide, bis(acetylacetonate) titanium di-n-butoxide, and bis(ethyl acetoacetate) titanium diisopropoxide. Component (C) is added at 0.005 to 2 parts by weight per 100 parts by weight of component (A). When the quantity of component (C) falls below the above range, the curing reaction cannot be completed. On the other hand, when the quantity of component (C) exceeds the above range, the storage stability after component (A) has been mixed with component (B) is reduced.

The order of mixing of components (A) to (C) is arbitrary; however, component (C) is preferably mixed with component (A) simultaneously with the mixing of component (B) or after the mixing of component (B). When the added number of moles of component (B) exceeds the combined number of equivalents of silanol groups and water in the system, the produced composition is a so-called single-package room temperature vulcanizable polyorganosiloxane composition which will remain uncured as long as exterior moisture is excluded and which will cure when brought into contact with water.

The room temperature vulcanizable polyorganosiloxane composition produced by the method of this invention may optionally contain an inorganic filler (D). Examples of inorganic reinforcing fillers are fumed silica, surface-hydrophobicized fumed silica, surface-hydrophobicized wet-process silica, carbon black, colloidal calcium carbonate, and fumed titanium dioxide.

Examples of inorganic extender fillers are diatomaceous earth, finely pulverized quartz, finely powdered calcium carbonate, and clays.

If necessary, the room temperature vulcanizable polyorganosiloxane composition produced by the method of this invention may contain pigments such as titanium dioxide, zinc white, and iron red oxide; flame retardants such as platinum compounds and metal carbonates; thermal stabilizers such as cerium oxide and cerium hydroxide; adhesion promoters such as silane coupling agents; antisoiling agents such as polyethers, sorbitol derivatives, and fluorine surfactants, and antimolds.

The resulting composition of this invention cures at room temperature into a resin or rubber in such a way that the post-cure quantity of uncrosslinked polysiloxane is extremely small. For this reason, the polysiloxane component will not migrate from the cured product to another substrate brought into contact with the cured product. Due to this, the composition can be widely used in applications such as electrical insulating materials, adhesives, coating materials, and sealing materials.

This invention will be explained using demonstrational examples. "Parts" in the examples denotes "parts by weight" in all cases and the various values, such as the viscosity, were measured at 25° C. in all cases.

REFERENCE EXAMPLE 1

Production of silanol group-terminated polydimethylsiloxane:

Silanol group-terminated polydimethylsiloxane oligomers (pentameric on the average) were polymerized in the presence of an extremely small amount of potassium hydroxide to obtain a silanol group-terminated polydimethylsiloxane (visosity 0.0135 m$^2$/s) denoted as "polymer A" below.

Octamethyltetracyclosiloxane was polymerized in the presence of a solid acid catalyst and then stripped at 150° C./10 mmHg to produce a silanol group-terminated polydimethylsiloxane (viscosity 0.0112 m$^2$/s) denoted as "polymer B" below.

Polymer B was stripped by a thin film technique at 200° C./10$^{-4}$ mmHg to obtain a silanol group-terminated polydimethylsiloxane (viscosity 0.0156 m$^2$/s) denoted as "polymer C" below.

Polymer B (300 g) was combined with acetone (600 g) and this was mixed at 45° C. to homogeneity and then allowed to cool for 1 day. The separated acetone phase was then removed. This process was repeated 5 times. Acetone in the polymer layer was stripped to obtain a silanol group-terminated polydimethylsiloxane (viscosity 0.0123 m²/s) denoted at "polymer D" below.

The proportion of components with molecular weights ≦5,000 in the polymers was determined by GPC and is reported in Table 1.

TABLE 1

| Polymer | % Components with Molecular Weights ≦ 5000, wt % |
|---|---|
| A | 0.5 |
| B | 5.2 |
| C | 1.8 |
| D | 0.4 |

EXAMPLE 1

Polymer A (100 parts), methyltri(methyl ethyl ketoxime)silane (4.0 parts), and the organotitanate ester given in Table 1 were charged to a mixer. The resulting mixture was thoroughly mixed and defoamed. The resulting composition was poured into a groove (width 20 mm, depth 2 mm) which had been milled in white granite (40 cm×40 cm×4 cm) and then was allowed to stand in the ambient for 14 days for curing into a rubbery material. The granite was then placed in a perpendicular position outdoors, 50 cm above the ground, for exposure. Soiling of the granite surface was inspected after 3 and 6 months and the results are reported in Table 2. In the table, NS represents no soiling, IS represents insignificant soiling, SS represents significant soiling and ESS represents extremely significant soiling (these criteria are also applicable below).

The above composition was also poured into a mold and subsequently allowed to stand in the ambient for 14 days for curing into a 2.0 mm thick rubber sheet. The rubber sheet was cut into 1 mm square pieces and 5 g of these pieces were then extracted with chloroform 4 times. The percent extraction is reported in Table 2.

COMPARISON EXAMPLE 1

Experiments were conducted by the methods of Example 1 with the exception that organotin compounds were used as catalysts instead of titanate esters. The results are also reported in Table 2.

The above results demonstrate that the extent of soiling and the degree of curing both significantly depend on the nature of component (C) comprising the catalyst even with the use of the same types of components (A) and (B). Organotitanate esters were thus found to be excellent catalysts.

TABLE 2

| Sample No. | Catalyst Compound | Amount (Parts) | Soiling After 3 months | Soiling After 6 months | Extraction (%) |
|---|---|---|---|---|---|
| Example 1 | | | | | |
| 1 | Ti(O—CH(CH$_3$)—CH$_3$)$_4$ | 0.1 | NS | NS | 0.6 |
| 2 | Ti(O—CH$_2$CH$_2$CH$_2$CH$_3$)$_4$ | 0.1 | NS | NS | 0.6 |
| 3 | Ti(O—CH$_2$CH$_2$CH$_2$CH$_3$)$_4$ | 0.02 | NS | NS | 0.7 |
| 4 | (CH$_3$CHO)$_2$Ti(CH$_3$COCHCOOCH$_3$)$_2$ (with CH$_3$ substituent) | 0.02 | NS | NS | 0.6 |
| 5 | (CH$_3$CHO)$_2$Ti(CH$_3$COCHCOOC$_2$H$_5$)$_2$ (with CH$_3$ substituent) | 0.5 | NS | NS | 0.6 |
| Comparison Example 1 | | | | | |
| 6 | none | — | SS | SS | 3.7 |
| 7 | Dibutyltin diacetate | 0.1 | ESS | ESS | 4.3 |
| 8 | Dibutyltin diacetate | 0.02 | ESS | ESS | 4.0 |
| 9 | Dibutyltin dioctoate | 0.1 | ESS | ESS | 4.4 |

EXAMPLE 2

Polymer A, C or D (100 parts), methyltri(dimethyl ketoxime)silane (3.5 parts), and tetrabutyl titanate (0.1 part) were charged to a mixer. The resulting mixture was thoroughly mixed and defoamed. Soiling by the compositions was inspected under the same conditions as in Example 1 and the results are reported in Table 3.

COMPARISON EXAMPLE 2

An experiment was conducted by method of Example 2 with the exception that dibutyltin dilaurate (0.2 part) was used as the catalyst instead of tetrabutyl titanate and the results are also reported in Table 3.

COMPARISON EXAMPLE 3

An experiment was conducted by the method of Example 2 with the exception that polymer B was used instead of polymer A, C or D and the results are also reported in Table 3.

TABLE 3

| Type | Sample No. | Polymer | Extraction (%) | Soiling After 3 months | Soiling After 6 months |
|---|---|---|---|---|---|
| Example 2 | 10 | A | 0.7 | NS | NS |
| | 11 | C | 2.1 | NS | IS |
| | 12 | D | 0.5 | NS | NS |
| Comparison Example 2 | 13 | A | 3.5 | SS | ESS |
| | 14 | C | 5.0 | ESS | ESS |
| | 15 | D | 3.8 | ESS | ESS |
| Comparison | 16 | B | 5.2 | ESS | ESS |

TABLE 3-continued

| Type | Sample No. | Polymer | Extraction (%) | Soiling After 3 months | After 6 months |
|---|---|---|---|---|---|
| Example 3 | | | | | |

EXAMPLE 3

Polymer A (100 parts) was thoroughly mixed with fumed silica (specific surface area 200 m²/g, 10 parts) and vinyltri(methyl ethyl ketoxime)silane (8 parts) in a mixer under nitrogen, combined with tetrabutyl titanate (0.2 part) and again mixed thoroughly, defoamed in vacuo and then filled into an aluminum tube.

EXAMPLE 4

Polymer A (100 parts) was thoroughly mixed with fumed silica (10 parts), methyltri(methyl ethyl ketoxime)silane (8 parts), n-propyl silicate (1 part), and tetrabutyl titanate (0.2 part) in a mixer under nitrogen, defoamed in vacuo and then filled into an aluminum tube.

EXAMPLE 5

Polymer D (100 parts) was thoroughly mixed with fine light calcium carbonate (100 parts) in a mixer in vacuo followed by mixing with methyltri(methyl ethyl ketoxime)silane (12 parts) and diisopropoxybis(acetylacetate) titanium (0.5 part) with careful attention to avoid introducing bubbles and this was then filled into an aluminum tube.

Soiling by the compositions of Examples 3 to 5 was inspected by the method of Example 1 with the exception that the depth of the groove in the granite stone was 10 mm. The compositions remaining after application were sealed in the aluminum tubes and stored at room temperature for 3 months in order to examine their extrudabilities and curabilities. The test results are reported in Table 4 where a G denotes "good".

TABLE 4

| Example No. | Sample No. | Soiling After 3 months | After 6 months | Storage stability in tube for 3 months Extrudability | Curability |
|---|---|---|---|---|---|
| 3 | 17 | NS | NS | G | G |
| 4 | 18 | NS | NS | G | G |
| 5 | 19 | NS | NS | G | G |

The examples above demonstrate that a room temperature vulcanizable polyorganosiloxane composition which has been produced by the method of this invention exhibits insignificant soiling around the periphery of the cured product because the post-cure quantity of uncrosslinked polysiloxane is extremely small.

REFERENCE EXAMPLE 2

Octamethylcyclotetrasiloxane (100 parts), tetramethyltetraphenylcyclotetrasiloxane (20 parts), potassium hydroxide (0.013 part) and water (0.36 part) were charged to a polymerization reactor, reacted at about 150° C. for 5 hours, neutralized with dimethyldichlorosilane, cooled, filtered and then stripped at 150° C./10 mmHg in order to obtain a silanol group-terminated dimethylsiloxanemethylphenylsiloxane copolymer which is denoted as "polymer E" below (viscosity 0.00384 m²/s, methylphenylsiloxane unit, 10.0 mol %).

The polymer was washed with acetone by the method used for polymer D in order to remove low molecular weight components to obtain a silanol group-terminated dimethylsiloxane-methylphenylsiloxane copolymer denoted below as "polymer F" (viscosity 0.00413 m²/s). The percentages of components with a molecular weight $\leq 5,000$ in these polymers are 5.7 wt. % for polymer E and 0.7 wt. % for polymer F.

EXAMPLE 6

Room temperature vulcanizable polyorganosiloxane compositions were produced by the method of Example 3 with the exceptions that polymer E or F was used instead of the polymer A used in Example 3 and a fumed silica (specific surface area 130 m²/g) which had been surface-hydrophobicized with dimethyldichlorosilane was used instead of the fumed silica.

The soiling and storage stability (in a tube) of the room temperature vulcanizable polyorganosiloxane composition were examined by the same method as in Example 3. The results for polymer F were identical to the results in Example 3. On the other hand, while the storage stability of polymer E in a tube was identical to that of Example 3, the stone was quite soiled both after 3 and 6 months.

That which is claimed is:

1. A room temperature vulcanizable polyorganosiloxane composition consisting essentially of the product obtained by mixing
   (A) 100 parts by weight of a polyorganosiloxane which has a viscosity at 25° C. of 0.001 to 0.2 m²/s, has at least two terminal silanol groups per molecule, contains $\leq 2$ weight percent components with a polystyrene-based molecular weight of $\leq 5,000$ according to the gel permeation chromatogram, and has organic radicals selected from the group consisting of monovalent hydrocarbon radicals and halogenated monovalent hydrocarbon radicals,
   (B) 0.5 to 30 parts by weight of a ketoxime silicon compound selected from silane of the general formula

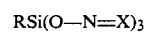
   $$RSi(O-N=X)_3$$

or its partial hydrolysis product wherein R represents a radical selected from the group consisting of alkyl, alkenyl, and phenyl, X represents $=CR_2'$ or $=CR^2$, each R' represents a monovalent hydrocarbon radical, and each $R^2$ represents a divalent hydrocarbon radical, and
   (C) 0.005 to 2 parts by weight of an organotitanate ester.

2. The composition according to claim 1 in which the polyorganosiloxane of (A) was prepared by polymerization in the presence of an acid or basic catalyst and subsequently purified by washing the polymerization product with a poor solvent.

3. The composition according to claim 1 with the modification that 0.5 to 150 parts by weight of an inorganic filler (D) is present.

4. The composition according to claim 2 with the modification that 0.5 to 150 parts by weight of an inorganic filler (D) is present.

5. The composition according to claim 1 in which the polyorganosiloxane of (A) is a silanol group-terminated polydimethylsiloxane and the ketoxime silicon compound is a silane which is selected from the group consisting of methyltri(methylethyl ketoximo)silane, methyltri(dimethyl ketoximo)silane, and vinyltri(methylethyl ketoximo) silane.

6. The composition according to claim 2 in which the polyorganosiloxane of (A) is a silanol group-terminated polydimethylsiloxane and the ketoxime silicon compound is a silane which is selected from the group consisting of methyltri(methylethyl ketoximo)silane, methyltri(dimethyl ketoximo)silane, and vinyltri(methylethyl ketoximo) silane.

7. The composition according to claim 3 in which the polyorganosiloxane of (A) is a silanol group-terminated polydimethylsiloxane and the ketoxime silicon compound is a silane which is selected from the group consisting of methyltri(methylethyl ketoximo)silane, methyltri(dimethyl ketoximo)silane, and vinyltri(methylethyl ketoximo) silane.

8. The composition according to claim 4 in which the polyorganosiloxane of (A) is a silanol group-terminated polydimethylsiloxane and the ketoxime silicon compound is a silane which is selected from the group consisting of methyltri(methylethyl ketoximo)silane, methyltri(dimethyl ketoximo)silane, and vinyltri(methylethyl ketoximo) silane.

9. The composition according to claim 1 in which (B) is present in an amount such that there is at least one molecule of (B) per silanol in (A).

* * * * *

UNITED STATES PATENT AND TRADEMARK OFFICE
CERTIFICATE OF CORRECTION

PATENT NO.   : 4,555,560
DATED        : November 26, 1985
INVENTOR(S)  : Toshio Saruyama and Ryuzo Mikami It is certified that error appears in the above-identified patent and that said Letters Patent is hereby corrected as shown below:

In Column 1, line 55; the words "will not soil substrates" should read " will not soil other substrates".

In Column 2, line 37; the words "mixture of °50 mol %" should read "mixture of $\geq$ 50 mol %".

In Column 4, line 58; the word "visosity" should read "viscosity".

In Column 5, line 65; the word "thich" should read "thick".

In Column 6, line 48; the words "conducted by method" should read "conducted by the method".

Signed and Sealed this

Twenty-sixth Day of August 1986

[SEAL]

Attest:

DONALD J. QUIGG

Attesting Officer

Commissioner of Patents and Trademarks